July 3, 1928. 1,675,824
J. B. RODGERS
GATE MECHANISM
Filed Nov. 26, 1926 10 Sheets-Sheet 1

Fig. 1.

John B. Rodgers Inventor
By C.A.Snow & Co.
Attorneys.

July 3, 1928.

J. B. RODGERS 1,675,824

GATE MECHANISM

Filed Nov. 26, 1926

July 3, 1928.  1,675,824
J. B. RODGERS
GATE MECHANISM
Filed Nov. 26, 1926  10 Sheets-Sheet 5

John B. Rodgers Inventor
By C.A.Snow&Co.
Attorneys

July 3, 1928. 1,675,824
J. B. RODGERS
GATE MECHANISM
Filed Nov. 26, 1926 10 Sheets-Sheet 7

John B. Rodgers Inventor
By C. A. Snow & Co.
Attorneys.

July 3, 1928.

J. B. RODGERS

GATE MECHANISM

Filed Nov. 26, 1926

John B. Rodgers Inventor

By C.A.Snow&Co.

Attorneys.

Patented July 3, 1928.

1,675,824

UNITED STATES PATENT OFFICE.

JOHN B. RODGERS, OF LITTLE ROCK, ARKANSAS.

GATE MECHANISM.

Application filed November 26, 1926. Serial No. 150,639.

This invention aims to provide a gate for a highway crossing at a railroad, novel means being provided for operating and controlling the movements of the gate and for giving appropriate signals both on a train and at a highway crossing, means being provided for controlling the movement of the train.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 10 is a sectional view of the gate, the cutting plane being slightly different from the cutting plane on which
Figure 7 is taken;

Figure 11 is a section on the line 11—11 of Figure 10;

Figures 12 and 13 are sectional views showing (in elevation for the most part) sundry switch details of the gate;

Figure 18 is a section taken about on the line 18—18 of Figure 17;

Figure 1:
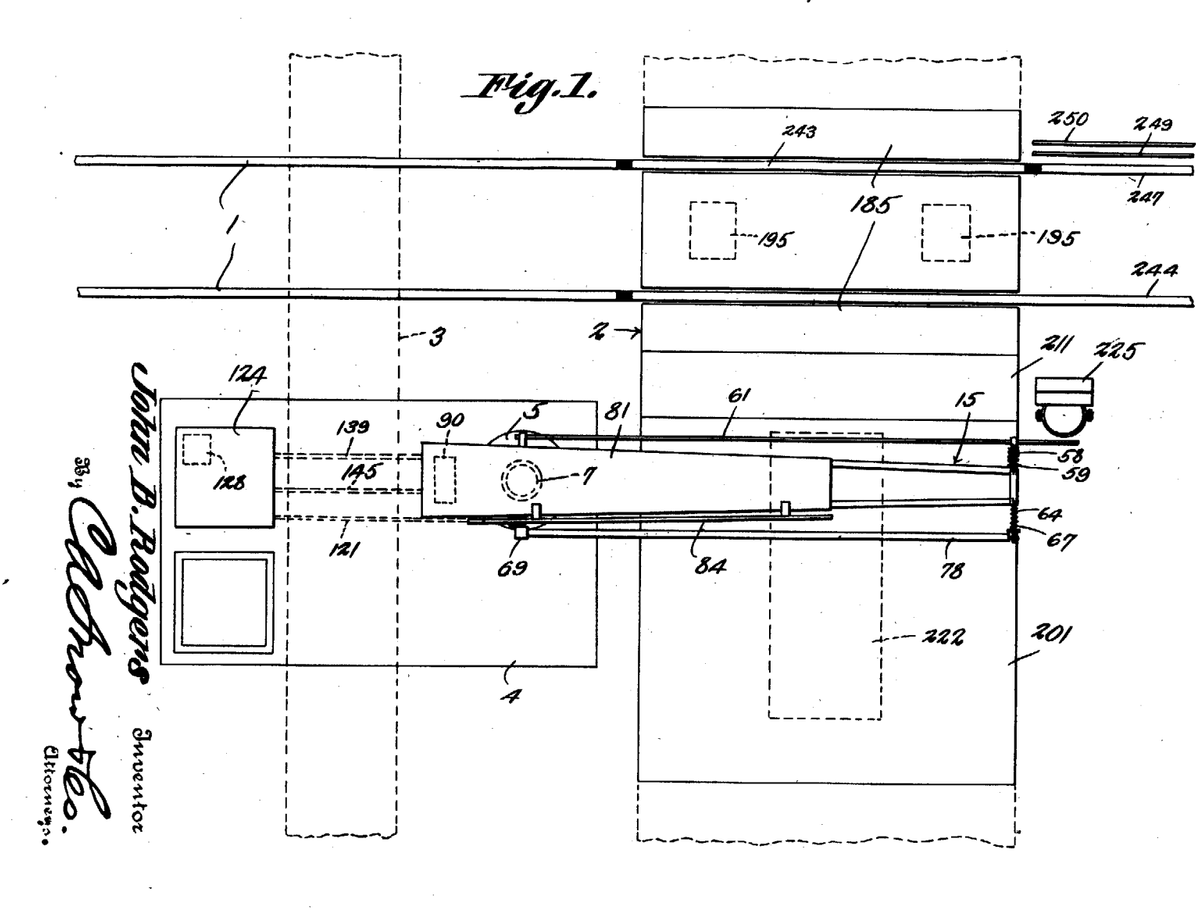
Figure 1 shows in plan, a device constructed in accordance with the invention, Figure 1ª showing another portion of the structure, and Figure 1ª being supplemental to Figure 1;

In Figure 1 there is shown a railroad track 1, intersected by a vehicle crossing 2 and by a crossing 3 for pedestrians. A foundation 4 is located properly with respect to the track 1 and the crossings 2 and 3 and carries a depressed ware plate 5. A hollow post 6 extends downwardly into the foundation 4 through the ware plate 5, and about the post 6, in spaced relation thereto, is disposed a hollow pedestal 7, roller bearings 11 being disposed between the pedestal 7 and the post 6, the roller bearings being supported at their lower ends on a wheeled truck 8 movable on the ware plate 5, the truck 8 being secured to the lower end of the pedestal 7, as Figure 15 will best disclose. There is a beveled gear 9 on the truck 8, the gear 9 being arranged concentrically with respect to the rotatable pedestal 7 that is journaled on the hollow post 6.

Figures 7, 8, 9:
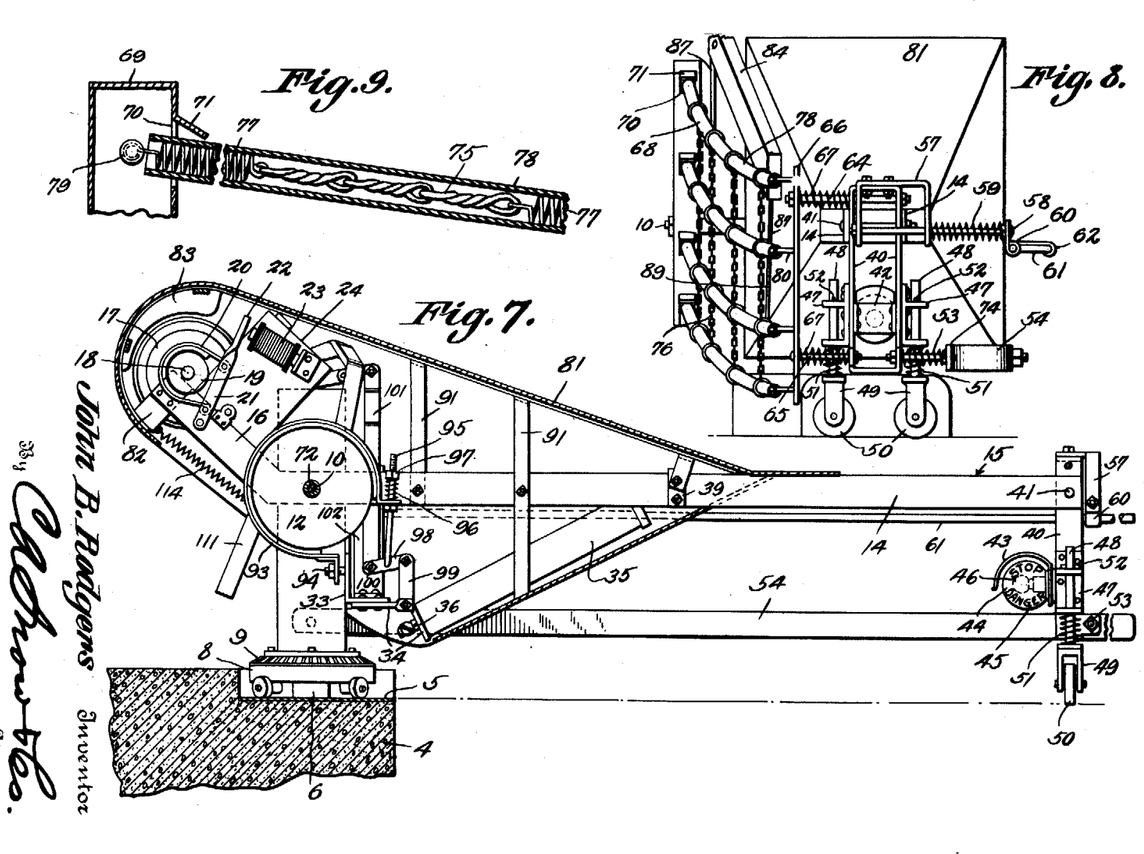
Figure 7 is a section of the gate, most parts appearing in elevation.
Figure 8 is an end elevation of the gate.
Figure 9 is a sectional view illustrating a detail of the gate;

A transverse shaft 10 is mounted to rock in the pedestal 7 above the post 6, and brake drums 12 are secured to the shaft 10. To the brake drums 12 and to the shaft 10 are secured the main bars 14 of a gate 15. Here note that the gate 15 can swing vertically with the shaft 10 as a center of swinging movement, and can swing horizontally with the post 6 (Figure 15) as an axis of swinging movement. Figure 7 shows that the main bars 14 of the gate are provided at their inner ends with upwardly inclined arms 16, on which is mounted an electric motor 17, the shaft 18 of which carries a brake drum 19 surrounded by a strap 20 secured to a lever 21 fulcrumed on one of the arms 16, the lever being equipped at its upper end with an armature 22 responsive to an electro-magnet 23 carried by a plate 24 mounted on one of the arms 16.

Figures 10, 11, 12, 13:
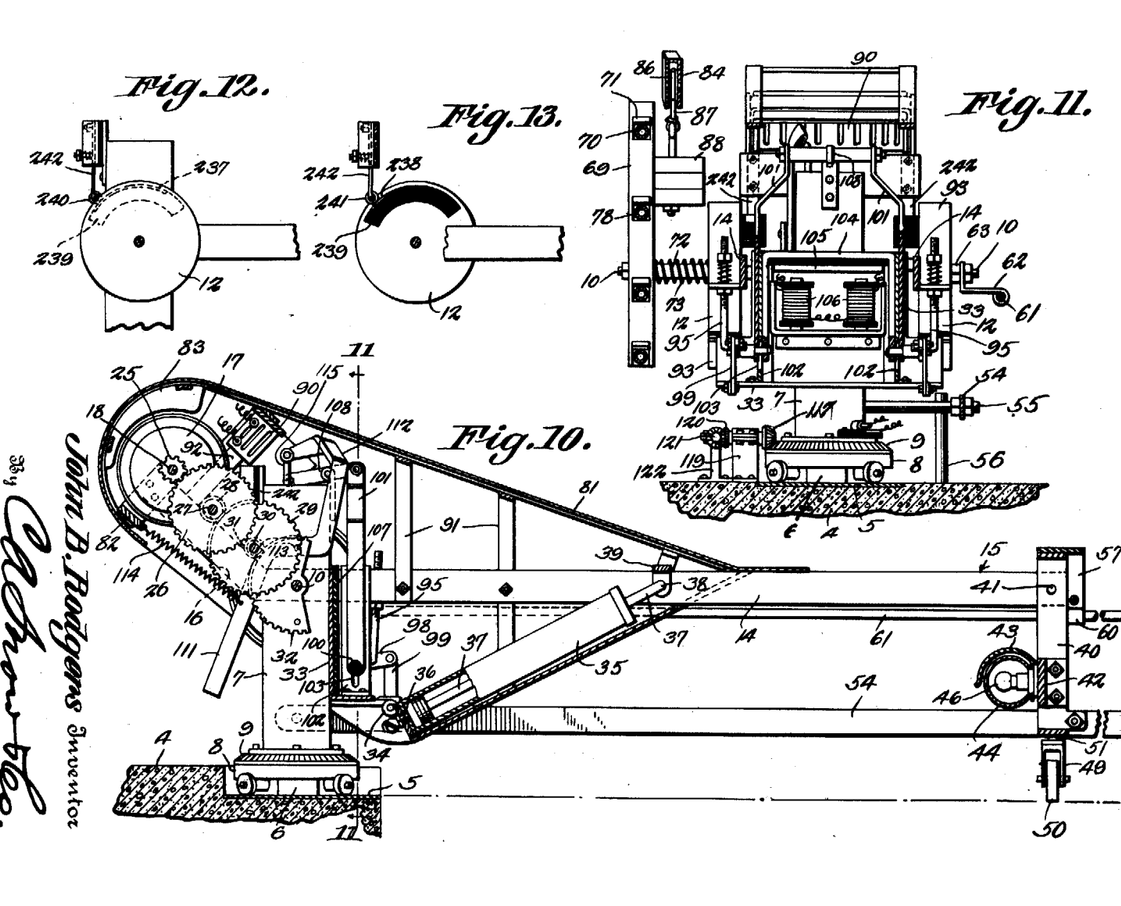

It appears from Figure 10 that there is a pinion 25 on the shaft 18 of the motor 17, the pinion 25 meshing with a gear wheel 26 on a shaft 27 journaled on the gate, the shaft 27 carrying a pinion 28 that meshes with a gear wheel 29 on a shaft 30 journaled on the gate frame, the shaft 30 carrying a gear wheel 31 which meshes with a segmental gear 32 on the shaft 10. The parts 25, 26, 28, 29, 31 and 32 constitute a reducing train connecting the motor shaft 18 with the shaft 10 which raises and lowers the gate 15.

An angle bracket 33, of considerable vertical extent, is secured to the rotatable hollow pedestal 7. By means of hinges 34, cushioning dash-pot cylinders 35 are connected to the horizontal flange of the angle bracket 33, adjustable air outlet valves 36 being mounted in the butt ends of the cylinders 35. The pistons 37 that work in the cylinders 35 are pivoted at 38 to a cross piece 39 joining the main bars 14 of the gate 15.

Figure 8 shows that a depending loop-shaped support 40 is pivoted at 41 to the outer ends of the bars 14 of the gate 15. A cross bar 42 (Figure 10) is mounted on the support 40 and carries an overhanging guard 43 beneath which is mounted a globe 44 having legends 45, such as "Stop" and "Danger" (Figure 7). Within the globe 44 is located an electric lamp 46, both the lamp 46 and the globe 44 being supported from the cross bar 42 on the member 40. Guides 47 (Figs. 8 and 7) are mounted on the support 40, and plungers 48 reciprocate in the guides, the plungers being provided at their lower ends with forks 49 wherein wheels 50 are journaled. Cushioning springs 51 surround the plungers 48 and are interposed between the forks 49 and the lower ends of the guides 47. When the gate 15 is lowered, as in Figure 7, the wheels 50 support the gate, the springs 51 cushioning the gate. When the gate is raised, as in Figure 14, the stops 52 keep the plungers 48 in place in the guides 47. As shown in Figures 7 and 8, a stud 53 is mounted to slide in one side portion of the support 40, the forward end of a brace 54 being mounted on the stud, pivotally if desired, a compression spring 74 being mounted on the stud 53 between the support 40 and the forward end of the brace 54, the rear end of the brace 54 being mounted pivotally, as shown in Figure 11, on a finger 55 which projects transversely from rotatable pedestal 7, the finger having an added function, in that it cooperates with a stop 56, mounted in the foundation 4, the parts 55 and 56 cooperating to limit the movement of the gate as the gate arrives at open position. The function of the brace 54 is to hold the support 40 about at right angles to the main bars 14 of the gate 15, when the gate is lowered as in Figure 10, the brace, nevertheless, permitting the support 40 to assume an acute angle with respect to the gate bars 14, when the structure is folded up, as in Figure 14, when the gate is raised to open position.

Mounted on the top of the support 40 is an inverted U-shaped bracket 57 shown in Figures 8 and 7. In the bracket 57 is mounted a slide 58 in the form of a bar, a compression spring 59 being mounted on the bar 58 between the bracket 57 and a socket member 60 mounted on the outer end of the bar 58, the socket member 60 carrying the forward end of the rod 61 which may be useful at times as a bumper, cushioned by the spring 59. The rear end of the rod 61 is mounted (Figure 11) in a bracket 62 held for adjustment at the will of an operator, by nuts 63, on one end of the shaft 10.

An upper slide 64 and a lower slide 65, each in the form of a rod, are carried by the loop-shaped support 40 on the opposite side thereof from the brace 54 and the rod 61. A bar 66 is carried by the slide rods 64 and 65, compression springs 67 being interposed between the bar 66 and the support 40. A tubular member 69 (Figure 9) is mounted intermediate its ends on a sleeve 72 (Figure 11) carried by the shaft 10 to turn thereon, a compression spring 73 being mounted on a sleeve 72, and abutting against one of the drums 12 and the tubular member 69, to cushion the inward movement of the tubular member 69. Figure 9 shows that the tubular member 69 has openings 70, over which project weather shields 71. A flexible barrier 68 extends lengthwise of the gate 15 and is made up of longitudinal chains 75 connected by cross chains 76, retractile springs 77 being interposed in the longitudinal chains 75, certain of the springs 77 being secured at 79 within the tubular member 69, the springs at the opposite ends of the chains 75 being secured at 80 to the bar 66. The chains 75 are housed within covers 78 of any flexible and protective material, the construction being such that if an automobile runs into the flexible barrier 68, neither the automobile nor the gate will be broken, owing to the flexibility of the barrier 68 and to the spring means whereby it is yieldably supported. The springs 77 and the covers 78 enter the tubular member 69 through the openings 70, under the protection of the shields 71.

Most of the operating parts for the gate 15 are housed underneath a metal casing 81 which may be connected at its forward end to the cross piece 39 and at its rear end to a cross piece 82 carried by the arms 16 of the main gate bars 14, as seen in Figures 10 and 7. The casing 81, moreover, may be sustained from the frame work of the gate by braces 91. In the rear upper portion of the casing 81 there is a counterweight 83 which aids in opening the gate. A U-shaped cover member 84 (Figure 11) is connected at 85 (Figure 14) to the casing 81 and is located to one side of the casing 81 (Figure 8), the cover member 84 being called by that name because it shields a flexible element 87 which is rove over pulleys 86 (Figure 14) journaled on and in the cover member 84, near to the ends thereof. The flexible element 87 is connected at its forward end, as shown at 89, to any accessible part of the flexible barrier 68. The downwardly extended rear end of the flexible element 87 carries an adjusted number of weights 88. When the gate is swung upwardly to an open position, as in Figure 14, the weights 88 exert a pull on the flexible element 87 and close the barrier 68 together. An electric heater 90 is located within the casing 81 and is supported at 92 on the frame work of the gate. In cold weather, the heater may be employed to raise the temperature within the casing 81 and to prevent freezing of any moisture which may have collected within the casing.

Figure 15:
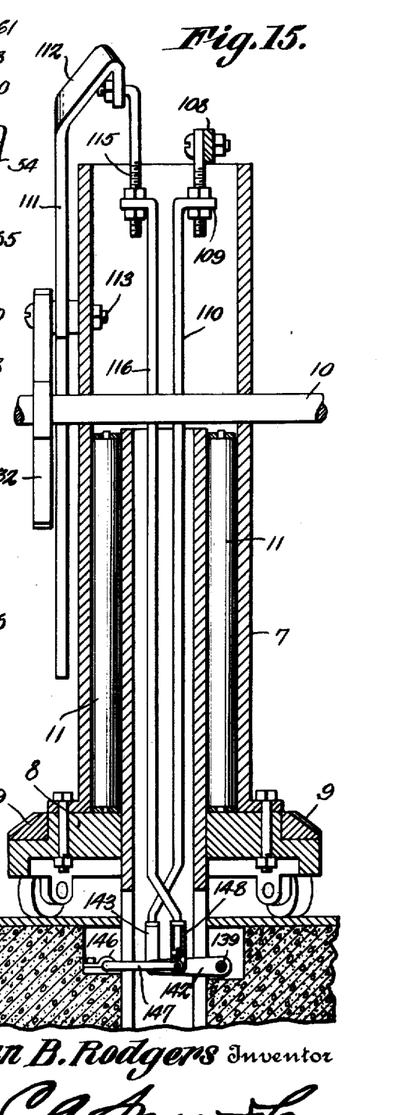
Figure 15 is a vertical section taken through the gate pedestal.

The drums 12 on the shaft 10 are surrounded by brake straps 93 connected at one end, as at 94, to the angle bracket 33 on the pedestal 7. Links 95 extend through the opposite ends of the brake straps 93, adjusting nuts 97 being mounted on the links, and compression springs 96 being interposed between the adjusting nuts and the ends of the brake straps. The lower ends of the links 95 are pivoted to levers 98 at points intermediate the ends of the levers, the outer ends of the levers 98 being pivoted to the upper ends of fulcrum members 99, the lower ends of which are pivotally supported on the angle bracket 33. Pivot elements 100 connect the inner ends of the levers 98 with the sides of an inverted U-shaped yoke 101 slidable on the outer sides of guides 102 mounted on the horizontal flange of the angle bracket 33, the guides 102 having slots 103 wherein the pivot elements 100 can move vertically. The pivot elements 100 are joined to the lower ends of an inverted U-shaped member 104 slidable on the inner surfaces of the guides 102. The U-shaped member 104 carries an armature 105 responsive to electromagnets 106 on the angle bracket 33, insulation 107 being interposed between electromagnets 106 and the vertical flange of the angle bracket 33. A lever 108 is fulcrumed intermediate its ends on the hollow pedestal 7, the outer end of the lever 108 being pivotally connected to the upper end of the yoke 101, the inner end of the lever 108 being adjustably connected at 109 (Figure 15) with a rod 110 which extends downwardly through the pedestal 7 and the post 6. The numeral 111 marks a lever which extends downwardly into the path of the cross piece 82, (Figure 10) so that when the gate 15 is swung up far enough to an open position, the cross piece 82 may engage the lower end of the lever 111, for a purpose which will be made manifest hereinafter. The upper end of the lever 111 is in the form of a U-shaped head 112, the extremity of which is inwardly extended, so that it lies above the hollow pedestal 7. The head portion 112 of the lever 111 is fulcrumed at 113 on the side of the pedestal 7, as shown in Figure 15, and as indicated in Figure 10. A retractile spring 114 connects the lever 111 with the cross piece 82, to hold the lever against unnecessary movement. Figure 15 shows that the upper and inwardly extended end of the head 112 of the lever 111 is adjustably connected at 115 to a rod 116 which extends downwardly inside the post 6 and the pedestal 7.

Figure 2:
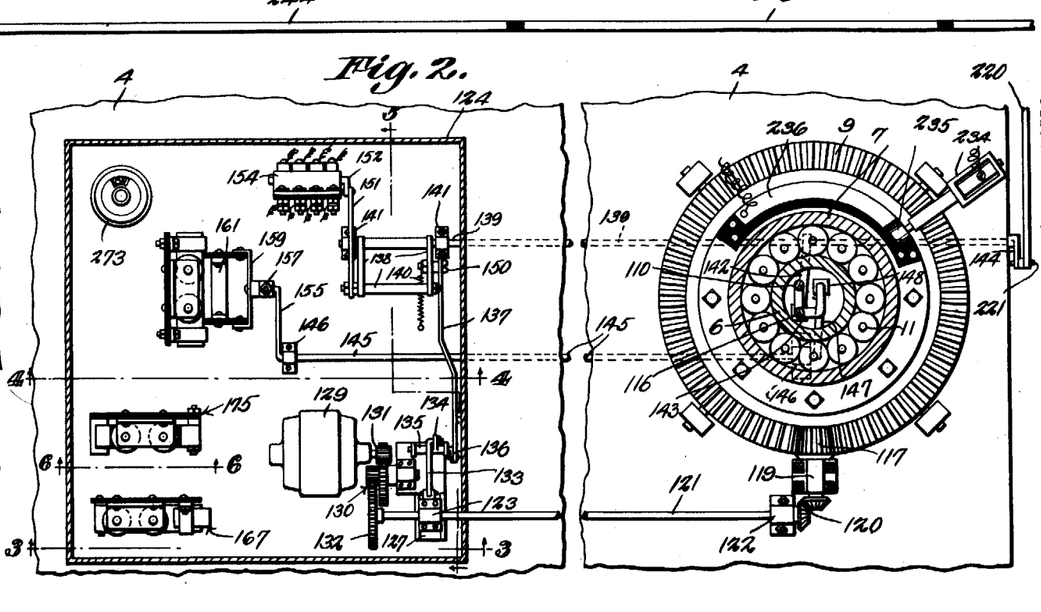
Figure 2 is a horizontal section taken through the gate-actuating mechanism.

As seen in Figures 2 and 11, the beveled gear 9 on the rotatable gate pedestal 7 is engaged by a beveled pinion 117 on a shaft which is enclosed within a casing 118, the casing housing the lower part of the pedestal 7 and its truck 8. In most figures of the drawing, the casing 118 has been omitted. The shaft that carries the beveled pinion 117 is journaled in a bearing 119, the said shaft being connected by beveled gears 120 with a shaft 121 shown, for instance, in Figures 2 and 4. Where the shaft 121 passes through the foundation 4, the shaft is located within a tube 126, seen in Figure 3. The shaft 121 is journaled on a bearing 122 located on the foundation 4, and on a bearing 123 which is slidably supported, as at 127, in a casing 124 having a lid 125 which may be opened or locked shut, the casing 124 being located on the foundation 4, and serving to house numerous parts hereinafter described and shown in Figures 3, 4 and 2 of the drawings. A heater, preferably electrically operated, and designated by the numeral 128, is located in the casing 124 and prevents freezing in cold weather.

An electric motor 129 is disposed in the casing 124, and a train of gears 130 connects a pinion 131 on the motor shaft with a gear wheel 132 on the shaft 121. A pitman 133 is pivoted to the slidable bearing 123 and is pivoted in an arm 134 on a shaft 135, mounted to rock on a block 149 which carries the slidable mounting 127 for the bearing 123. At one end, the shaft 135 has a depending arm 136 whereunto is pivoted one end of a rod 137 pivoted at its opposite end, at 150, to a crank frame 138 secured to a shaft 139 journaled in bearings 141, a retractile spring 140 being connected to the crank frame 138 and to the bottom of the casing 124, to hold the crank frame yieldably in the inclined position shown in Figure 5. The shaft 139 extends through the foundation 4 to a point beneath the rotatable gate pedestal 7, and is there provided with an arm 142 united by swivel connection 143 with the rod 110, the rod 110 being connected by the part 109, the lever 108, the yoke 101, the pivot elements 100, the levers 98, and the links 95, with the brake straps 93 that cooperate with the drums 12 to regulate the vertical swinging movement of the gate 15. Figure 2 shows that the shaft 139 is provided at its outer end with a crank 144. The actuating means which is connected to the crank 144 will be described hereinafter.

A shaft 145 is supported in bearings 146 and extends under the rotatable gate pedestal 7. The shaft 145 is there provided with an arm 147 (Figure 15) connected by a swivel joint 148 with the rod 116 which is connected at 115 to the lever 111—112.

A link 151 is pivoted to the crank frame 138 on the shaft 139, and is pivoted to the arm 152 of the rotary member 153 of an electric switch 154 in the casing 124. The shaft 145 has a crank arm 155 that is pivoted at 156 to an adjustable connection 157 embodying a screw, and nuts thereon, the nuts being engaged with a bracket 158 on a lever 159, the lever being fulcrumed at 160, intermediate its ends, on a standard 161, a retractile spring 169 joining one end of the lever 159 with the casing 124. The numeral 183 designates a reversing switch including electro-magnets 163 carried by a plate 164, the armature 162 for the electro-magnets 163 being under the control of the lever 159. The armature 162 has terminals 232 and 233, the terminal 232 being adapted to move between contacts 165 and 165ᵃ on the plate 164, and the terminal 233 being adapted to move between the terminals 166 and 166ᵃ on the plate 164.

Figure 3:
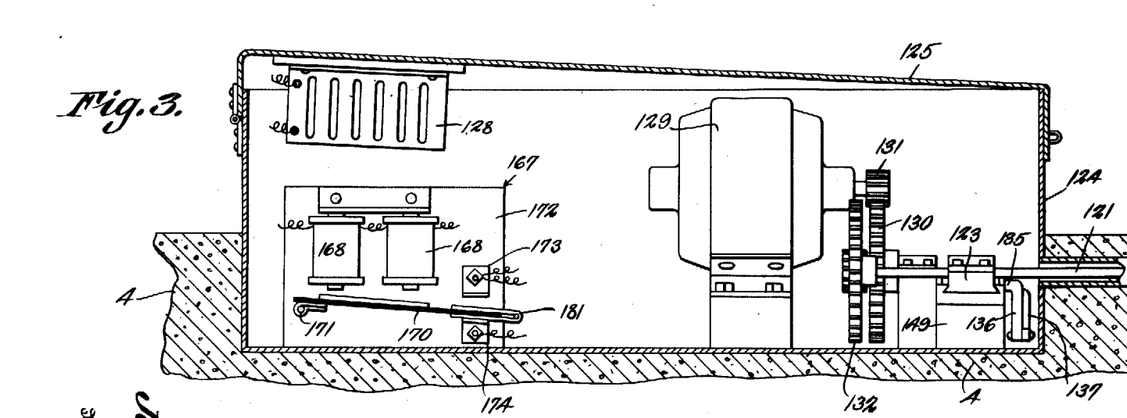
Figure 3 is a vertical section taken on the line 3—3 of Figure 2.

A second relay 167 is shown in Figures 2 and 3 and includes electro-magnets 168 on a plate 172 having terminals 173 and 174, adapted to be engaged, one at a time, by a terminal 181 on an armature 170 which is pivotally mounted at 171 on the plate 172, the armature being responsive to the electro-magnets 168.

Figure 6:
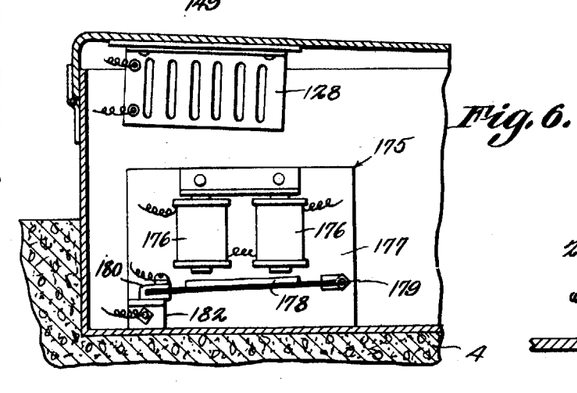
Figure 6 is a vertical section taken on the line 6—6 of Figure 2;

A third relay 175, shown in Figures 6 and 2 is provided, and includes electro-magnets 176 on a plate 177, the armature for the electro-magnets 176 being shown at 178 and being pivotally mounted at 179, the armature 178 having a contact terminal 180 adapted to move into and out of contact with a terminal 182 carried by the plate 177.

A foundation 184 (Figure 20) is located at the crossing 2 (Figure 1). Above the foundation 184 is located a platform 185 including beams 186, the parts 185 and 186 being held together by bolts 187 having shoulders 190 engaging the lower edges of the beams 186. The bolts 187 slide in anchor plates 188 carried by the foundation 184, and the heads of the bolts 187, cooperating with the anchor plates 188, limit the upward movement of the platform 185 under the action of springs 189 on the bolts 187 and interposed between the shoulders 190 and the anchor plates 188. There are switch members 191 on the foundation 184, the parts 191 being adapted to cooperate with switch members 192 on the foundation 184, the switch members 191 and 192 being normally held in spaced relation, by the springs 189. A conductor 193 joins the switch members 191, and the conductor 194 joins the switch members 192. The object in having a plurality of switch members is that if one pair of the switch members 191—192 fails to operate, another pair will operate. An electric heater 195 is located at any suitable place under the platform 185, to prevent freezing, and there may be as many of the heaters 195 as is considered expedient or necessary.

Figures 16, 17:
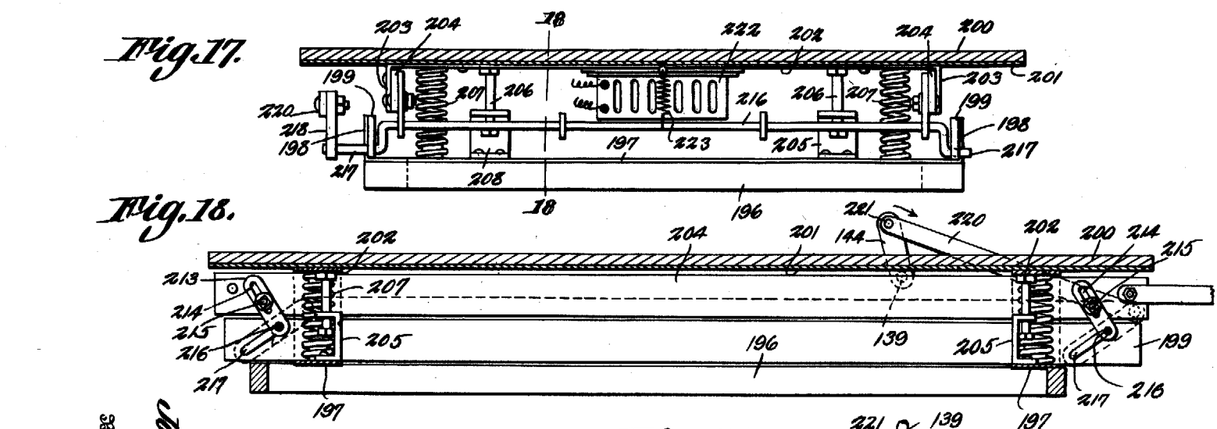
Figure 17 is an end view of one of the platforms and attendant parts.
Figure 19:
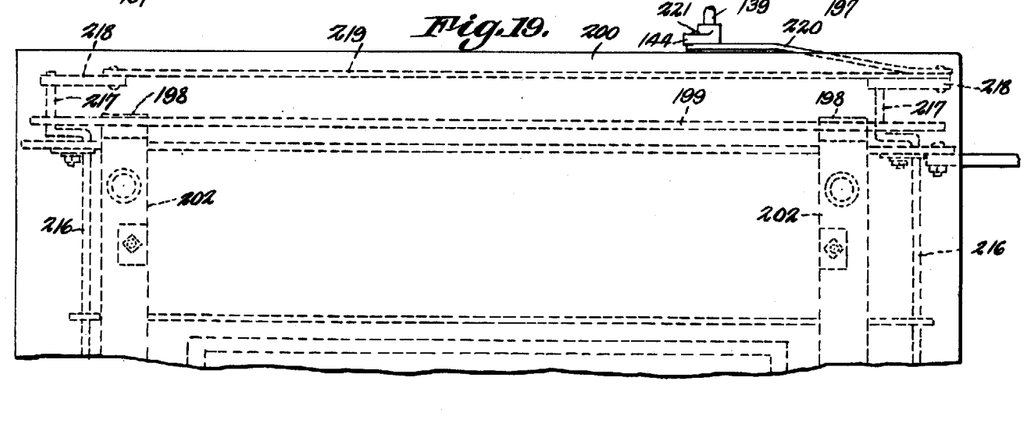
Figure 19 is a plan of the platform, parts being broken away.

A base 196 (Figure 17) extends along the crossing 2, beneath the gate 15, when the gate is lowered. Cross bars 197 are secured to the base 196 and have upturned ends 198 on which lower sills 199 are secured. A platform 200 is located above the base 196, and a plate 201 is secured to the lower surface of the platform 200, cross bars 202 being mounted on the plate 201, the cross bars 202 being alined with the cross bars 197 on the base 196. The cross bars 202 have depending ends 203 to which are attached upper sills 204. Headed studs 206 are connected to the cross bars 202 and slide in brackets 205 on the cross bars 197, the parts 205 and 206 cooperating to limit the upward movement of the platform 200 with respect to the base 196. The platform 200 is supported yieldingly on compression springs 207 attached at their upper ends to the cross bars 202 of the platform 200, and at their lower ends to the cross bars 197 of the base 196. A heater 222, preferably electrically operated, is located beneath the platform 200, to prevent freezing.

Figures 20, 21, 22, 23:
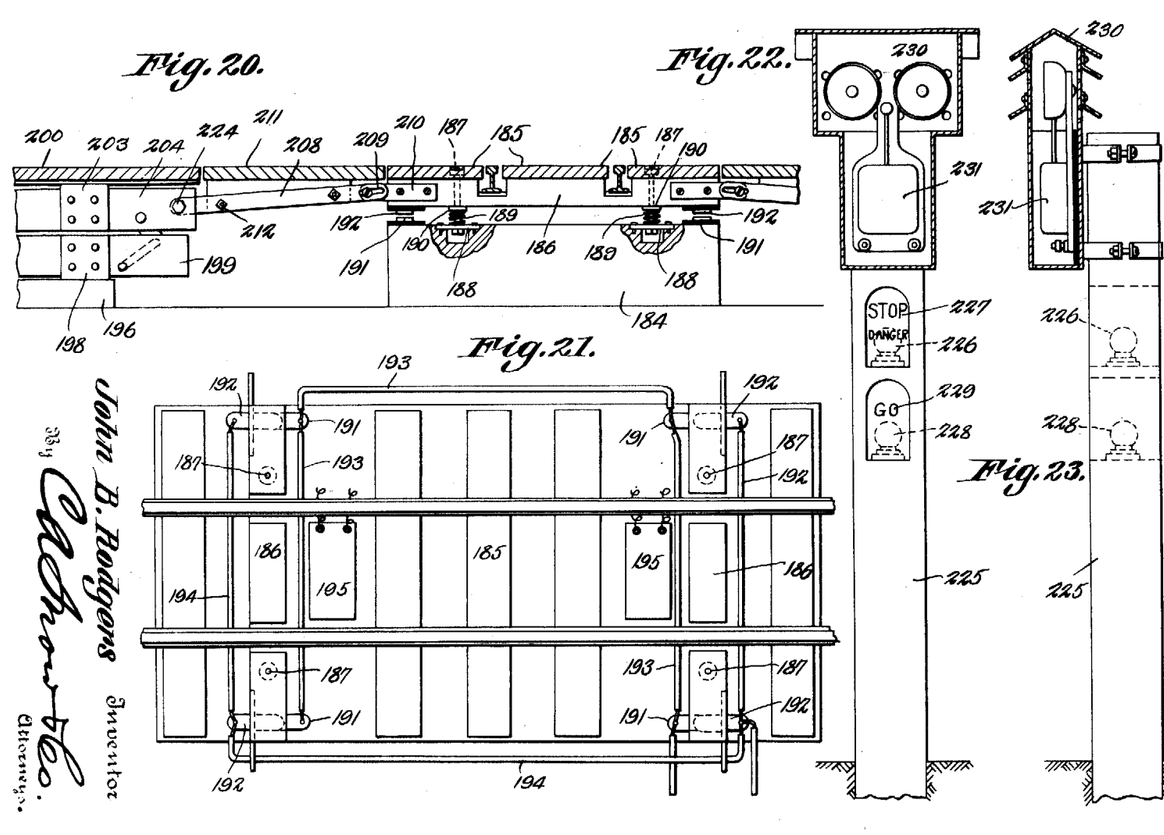
Figure 20 is a sectional view disclosing the tracks in relation to sundry of the platforms.
Figure 21 is a plan of the structure shown in Figure 20.
Figure 22 is an elevation of the signal tower, parts being in section.
Figure 23 is a sectional view of the signal tower, the cutting plane being about at right angles to the cutting plane in Figure 22, and parts being in elevation.

Carrier bars 208 are pivotally connected to the upper or platform sills 204, as shown at 224 in Figure 20. The carrier bars 208 being united by pin and slot connections 209 with anchor strips 210 on the beams 186 of the platform 185, the connections at 209 permitting the platform 200 to have a slight vertical movement, and, at the same time, be joined to the platform 185. Auxiliary platform sections 211 are secured at 212 to the carrier bars 208.

Inclined arms 213 (Figure 18) are attached by securing elements 215 to the sills 204 of the platform 200, the arms having slots 214, receiving the securing elements 215 and permitting an adjustment of the arms 213. In the lower ends of the arms 213 are mounted cranks 216 on shafts 217 which are mounted to rock in the sills 199 on the base 196. Retractile springs 223 connect the cranks 216 with the plate 201 on the platform 200, and tend to swing the cranks into the position shown in Figure 17. On the outer ends of the shafts 217 there are crank arms 218 on which is pivoted the ends of a connecting rod 219, a link 220 being pivoted to one of the crank arms 218 and being pivoted at 221 to the crank 144 on the shaft 139, Figure 18 being compared with Figure 2, at this point.

A post 225 is located near to the crossing 2 and carries an electric lamp 226 adapted to illuminate a warning legend 227 on the post 225. A lamp 228 is mounted in the post 225 and is adapted to illuminate a sign 229, consisting of the word "Go" or any other statement which will indicate that traffic may proceed in safety. The customary colors, or any colors required by traffic regulations, may be used in connection with the signals shown at 227 and 229. There is a perforated housing 230 on the post 225, within which is located an electrically operated audible signal 231, such as an electric gong.

There is a bearing 234 on the foundation 4, and the bearing supports a roller 235 adapted to cooperate with a contact 236 on the bottom portion of the pedestal 7. Contacts 237 and 238 are provided, the same being carried by insulating projections 239 on the drums 12. A roller 240 cooperates with the contact 237, and a roller 241 cooperates with the contact 238. The rollers 240 and 241 are supported at 242 on the frame of the gate 15.

Figure 26:
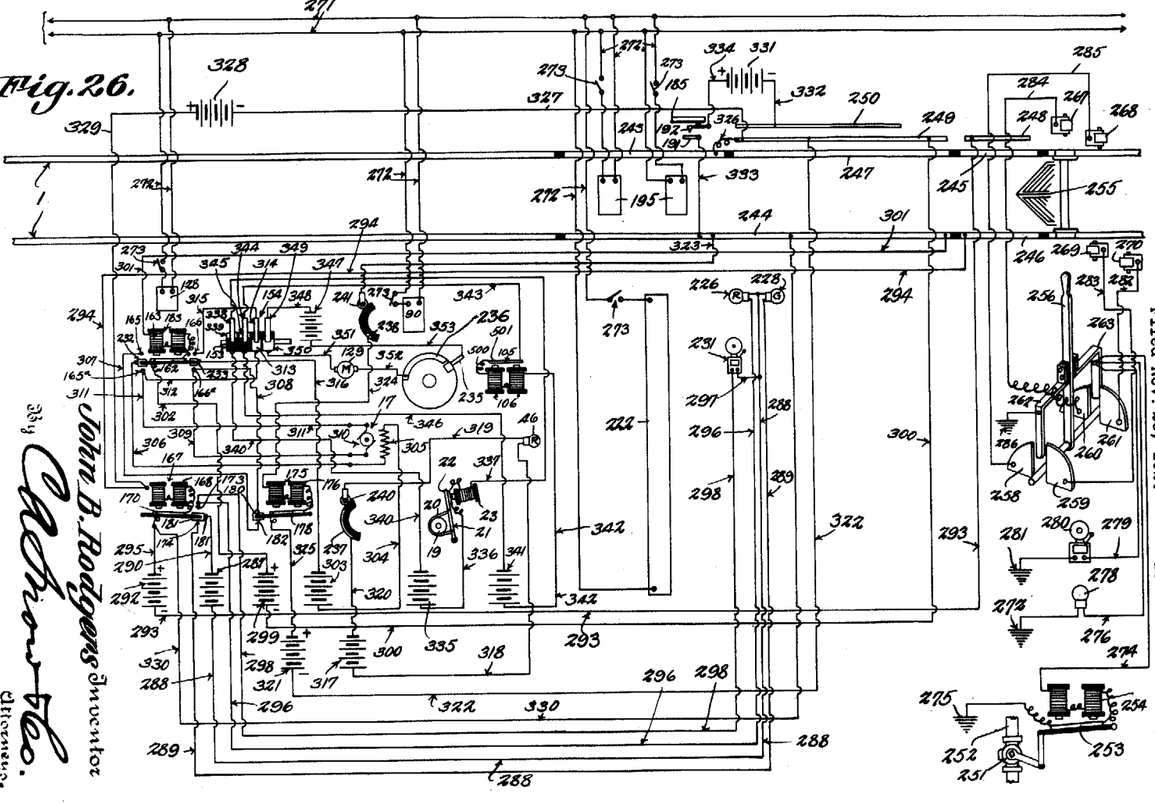
Figure 26 is a diagram showing the circuits and attendant parts.

Figure 26 shows that the track 1 includes insulated rail sections 243, 244, 245, 246 and 247. A first ramp 248 is located along the railroad track, and a second ramp 249 is alined with the ramp 248. A third ramp 250 is located outwardly of the ramp 249.

The numeral 251 marks a valve in the air brake line 252 of a locomotive engine 255. The valve 251 is operated by an armature 253 that is responsive to an electro-magnet 254 on the locomotive engine 255.

Figure 24:
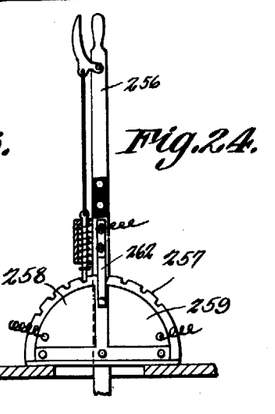
Figures 24 and 25 are elevations showing the switch mechanism which is associated with the reverse lever on the locomotive engine.
Figure 25:
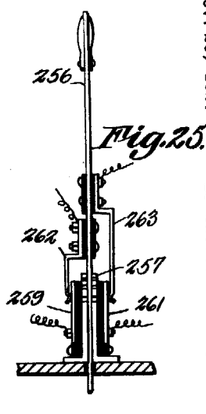

Comparing Figures 24, 25 and 26, the numeral 256 indicates the reverse lever of a locomotive engine 255. The quadrant for the reverse lever 256 is shown at 257 and carries insulated contacts 258, 259, 260 and 261. A wiping contact spring 262 on the reverse lever 256 cooperates with the contacts 258 and 259, a wiping contact spring 263 on the reverse lever 256 cooperates with the contacts 260 and 261.

Figures 14, 16:
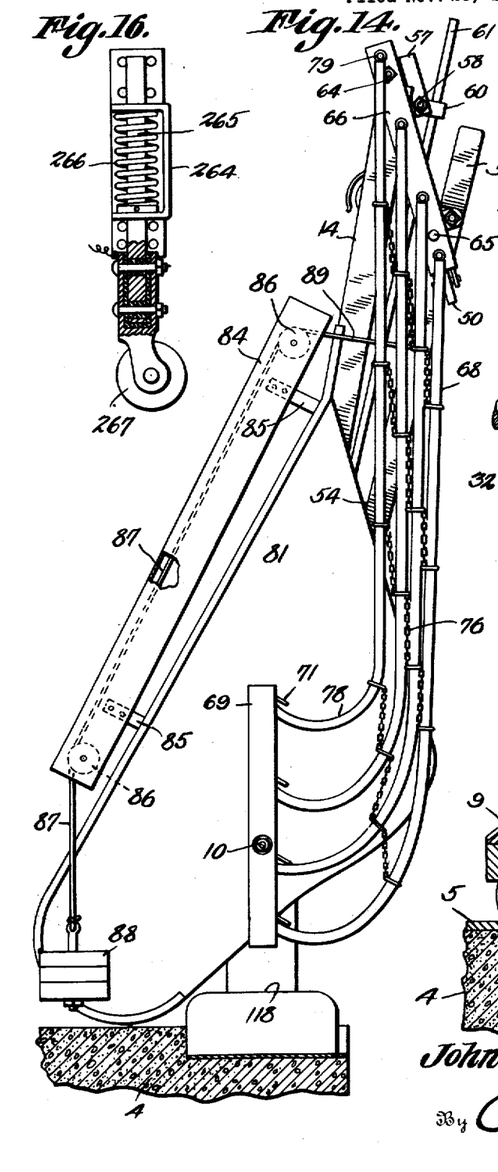
Figure 14 is an elevation wherein the gate is shown raised;
Figure 16 is a sectional elevation showing a shoe which is mounted on the locomotive engine;

Referring to Figure 16, it may be stated that frames 264 are located on the locomotive 255, and in the frames 264, plungers 265 are slidably mounted, the upward movement of the plungers 265 being resisted by springs 266. The plungers carry rollers 267, 268, 269 and 270, as shown in Figure 26 of the drawings. The roller 268 is adapted to cooperate with the ramps 248 and 249, and the roller 267 is adapted to cooperate with the ramp 250, when the locomotive engine 255 is headed in the direction shown in Figure 26; but when the locomotive engine is headed in an opposite direction, then the roller 270 cooperates with the ramp 250, and the roller 269 cooperates with the ramps 249 and 248.

The power lines are shown at 271. Conductors 272 connect the power lines 271 with the heaters 195, 128, 90 and 222. In the conductors 272 are located switches 273, so that the operator can turn the heaters on and off at pleasure.

A conductor 274 connects the wiping contact spring 263 with the electro-magnet 254. The electro-magnet 254 is grounded at 275 on the frame work of the engine.

A conductor 276 is connected to the wiping contact 263 on the reverse lever 256, and is grounded as at 277, a lamp 278 being interposed in the conductor 276. A conductor 279 is connected to the wiping contact 263 and an audible signal 280, such as a bell, located on the engine, is interposed in the conductor 279. The conductor 279 is grounded as at 281. A conductor 282 extends between the roller 270 and the contact 261. A conductor 283 extends between the roller 269 and the contact 259. A conductor 284 extends between the roller 267 and the contact 260. A conductor 285 extends between the roller 268 and the contact 258. The wiping contact spring 262 is grounded as shown at 286.

The numeral 287 marks a battery. A conductor 288 extends from the battery 287 to the lamp 228. A conductor 289 extends between the lamp 228 and the terminal 174. A conductor 290 joins the terminal 181 and the battery 287.

The numeral 292 marks a battery. A conductor 293 extends between the battery 292 and the first ramp 248. A conductor 294 joins the rail section 246 with the electro-magnets 168. A conductor 295 joins the electro-magnets 168 with the battery 292. A conductor 296 extends between the electric lamp 226 and the terminal 173. A conductor 297 extends between the conductor 288 and the signal 231. A conductor 298 is joined to the signal 231 with the terminal 173.

The numeral 299 marks a battery. A conductor 300 joins the battery 299 with the ramp 249. A conductor 301 extends between the rail section 244 and the relay 183. A conductor 302 joins the relay 183 with the battery 299.

The numeral 303 designates a battery. A conductor 304 leads between the battery 303 and the field 305 of the motor 17. A conductor 306 joins the conductor 305 with the terminal 232. A conductor 307 extends between the terminal 165 and the terminal 182. A conductor 308 joins the terminal 180 with the contact 166ª. A conductor 309 joins the terminal 166ª with the armature 310 of the motor 17. A conductor 311 extends between the armature 310 and the terminal 165ª. A conductor 312 extends between the terminal 165ª and the electric switch 154. The contact 313 of the switch 154 cooperates with a stationary contact 314. A conductor 315 is joined to the contact 314 and to the contact 166. A conductor 316 extends between the terminal 233 and the battery 303.

The numeral 317 designates a battery to which is joined a conductor 318 that is joined also to the electric lamp 46. A conductor 319 leads between the lamp 46 and the roller 240. A conductor 320 connects the battery 317 with the contact 237.

The numeral 321 marks a battery. A conductor 322 extends between the battery 321 and the ramp 249. A conductor 323 joins the rail section 244 with the roller 241. A conductor 324 joins the contact 238 with the relay 175. A conductor 325 joins the electro-magnets 176 with the battery 321. A conductor 326 joins the ramp 249 with the rail section 243. A conductor 327 is connected to the ramp 249 and to the battery 328. A conductor 329 extends between the battery 328 and the electro-magnets 168. A conductor 330 joins the electro-magnets 168 with the rail sections 244. The numeral 331 designates the battery. A conductor 332 extends between the battery 331 and the ramp 250. A conductor 333 joins the rail section 244 with one of the switch members 191 on the foundation 184. A conductor 334 joins one of the switch members 192 on the platform 185 with the battery 331.

The numeral 335 designates a battery. A conductor 336 is joined to the battery 335 and to the electro-magnet 23. A conductor 337 extends between the electro-magnet 23 and a fixed brush 338 of the rotary switch 154. The brush 338 cooperates with a rotary contact 339 forming part of the rotary member 153 of the switch 154. A conductor 340 joins the rotary contact 339 with the battery 335.

The numeral 341 marks a battery, a conductor 342 extending between the battery 341 and the electro-magnets 106. A conductor 343 extends between the magnets 106 and a fixed brush 344 which forms part of the switch 154. The brush 344 cooperates with a rotatable contact 345 constituting part of the switch 154. A conductor 346 connects the contact 345 with the battery 341.

The numeral 347 denotes a battery. A conductor 348 extends between the battery 347 and a brush 349 cooperates with a rotary contact 350, the parts 349 and 350 constituting portions on the switch 154. A conductor 351 joins the contact 350 to the motor 129. A conductor 352 extends between the motor 129 and the contact 236. A conductor 253 extends between the roller 235 and the battery 247.

Normally, the green lamp 228 on the post 225 is lighted, and the gate 15 is opened and raised, as shown in Figure 14. As the locomotive engine 255 approaches the crossing, the roller 268 on the locomotive rides on the first ramp 248. Now there is established a circuit comprising the battery 292, the conductor 293, the ramp 248, the contact roller 268, the conductor 285, the contact 258 on the reverse lever segment, the brush 262, the ground 286 to the frame of the locomotive, the rail 246, the conductor 294, the relay 167, the conductor 295, the battery 292. The contact 181 is thereby raised leaving the contact 174 and opening a circuit through the green lamp 228 on the post 225, that circuit comprising a conductor 290, the battery 287, the conductor 288, the lamp 228, and the conductor 289. The red lamp 226 on the post 225 is lighted, the circuit comprising the battery 287, the conductor 290, the terminal 181, the terminal 173, the conductor 296, the lamp 226, the conductor 288, and the battery 287. There is also established a circuit comprising a terminal 173, a conductor 298, the bell 231, the conductor 297, the conductor 288, and the battery 287. In view of the foregoing, the first object accomplished as the locomotive engine 255 approaches the crossing, is the extinguishment of the green signal lamp 228, the lighting of the red signal lamp 226 and the sounding of the audible signal 231.

As the locomotive 255 proceeds, the roller 268 on the locomotive rides on the ramp 249 and causes the current from the battery 299 to flow through the conductor 300, the ramp 249, the contact roller 268, the conductor 285, the contact 258, the wiper brush or spring 262, the ground 286, the frame of the locomotive 255, the rail 244, the conductor 301, the reversing switch 183, the conductor 302, and the battery 299.

This closes the motor circuit, which is as follows:—

The battery 303, the conductor 304, the field 305 of the motor 17, the conductor 306, the contact 232, the contact 165, the conductor 307, the contact 182, the contact 180, the conductor 308, the contact 166ᵃ, the conductor 309, the armature 310, on the motor 17, the conductor 311, the contact 165ᵃ, the conductor 312, the contact 313, of the switch 154, the wiper 314, the conductor 315, the contact 166, the contact 233, the conductor 316, and the battery 303. The approaching train, thus, lowers the gate 15, and, referring to Figure 10 of the drawings, it will be seen that, mechanically considered, the lowering of the gate is brought about by the motor 17, the shaft 18, the pinion 25, the gear wheel 26, the pinion 28, the gear wheel 29, the pinion 31, the segmental gear 32, and the shaft 10.

As the gate 15 moves downwardly to closed position, the lamp 46 on the gate is lighted by the closing of a circuit including the battery 317, the conductor 318, the lamp 46, the conductor 319, the contact roller 240, the contact 237, the conductor 320, and the battery 317.

After the gate 15 has been lowered, the circuit of the motor 17, of course, must be opened, to stop the operation of the motor. This is accomplished through the instrumentality of a cut-off circuit including the battery 321, the conductor 322, the ramp 249, the contact roller 268, the conductor 285, the contact 258, the brush 262, the ground 286, the frame work of the locomotive engine 255, the rail 244, the conductor 323, the roller 241, the contact 238, the conductor 324, the relay 175 thus being cut-off, the conductor 325, and the battery 231.

The gate 15 now is closed, the motor 17 has ceased to operate, the locomotive engine is approaching, the red lamp 226 on the post 225 is lighted, and the bell 231 is ringing.

A new circuit now is made to hold the relay 167 energized, thereby to keep the lamp 226 lighted, and the bell 231 ringing, until the last car of the train has cleared the crossing. The circuits above mentioned include the battery 328, the conductor 329, the relay 167, the conductor 330, the rail 244, the wheel and axle of the locomotive engine 255, the rail 243, the conductor 326, the ramp 249, the conductor 327, and the battery 328.

Figure 4:
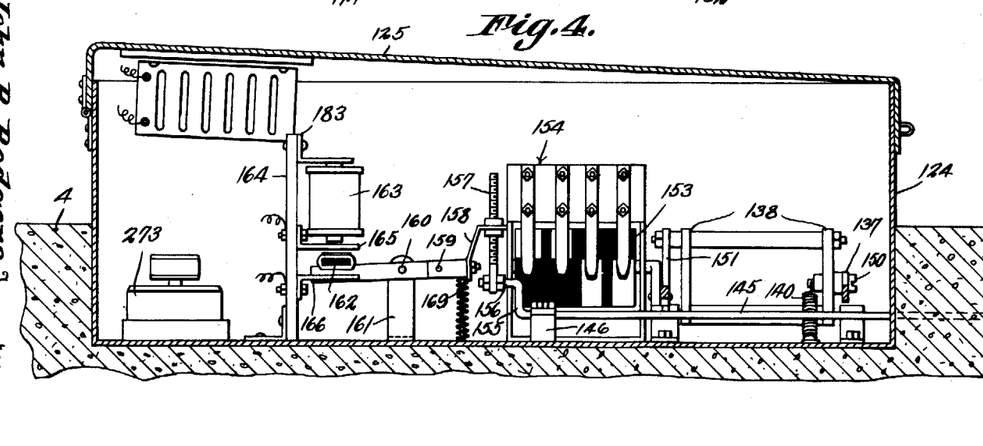
Figure 4 is a vertical section taken on the line 4—4 of Figure 2.
Figure 5:
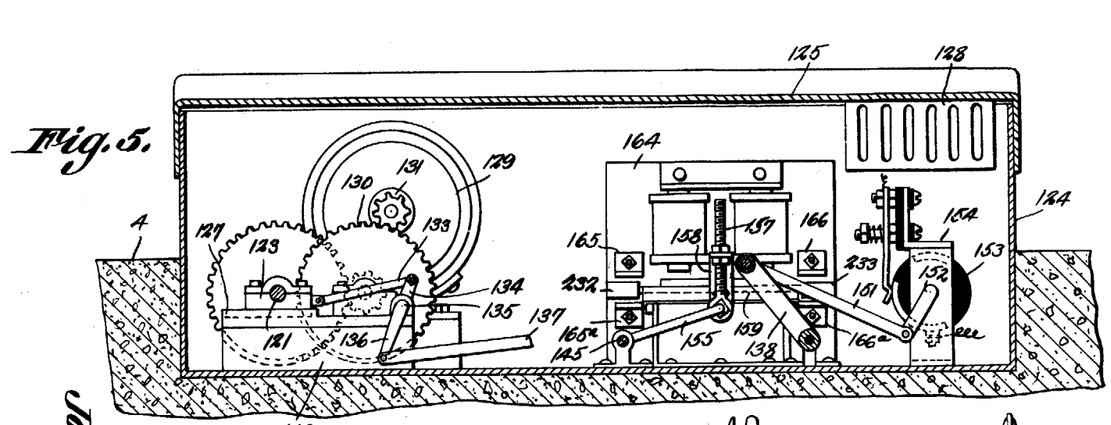
Figure 5 is a vertical section taken about on the line 5—5 of Figure 2.

It may be remarked that when the gate is open, with the cross piece 82 in contact with the lever 111, the lever 111 is tilted on its fulcrum 113, and the head 112 of the lever, operating through the connection 115 (Figure 15) moves the rod 116 downwardly, rocking movement being imparted to the shaft 145 by way of the arm 147, the arm 155 of Figure 5, swinging downwardly, and the adjustable connection 157 lowering the right-hand end of the lever 159 in Figure 4, the left-hand end of the lever 159 being raised, and the armature 162 being raised, and held in a neutral position between contacts 165 and 165ᵃ on one side, and 166 and 166ᵃ on the other side.

Assuming that the gate 15 is closed, then, when the train clears the traffic platform, the relay 175 is de-energized, the cut-off circuit is closed at 180 and 182, the circuit being open at 180—182 when the train clears the ramp rail 249.

The gate being closed, the motor circuit is closed to raise the gate 15, as follows: the battery 303, the conductor 304, the field 305 of the motor, the conductor 306, the contact 232, the contact 165ᵃ, the conductor 311, the armature 310 of the motor 17, the conductor 309, the contact 166ᵃ, the contact 233, the conductor 316, and the battery 303.

The gate rises until it engages the lever 111, and opens the motor circuit.

If there happens to be a vehicle on the track platform 185, then the platform moves downwardly and closes a circuit including the battery 331, the conductor 332, the ramp 250, the roller 267, the conductor 284, the contact 260 on the quadrant, the brush 263, the conductor 274, the conductor 276, and the conductor 279, the relay 254 being energized to operate the valve 251 and to set the brake on the locomotive engine, the lamp 278 being lighted, and the signal 280 being sounded. But, if a vehicle happens to be standing on the track platform 185, the train is brought to a stand-still, by the application of the brakes, and the engine driver is admonished both by the visible signal 278 (or lamp) and by the audible signal or bell 280. During the operation above described, the current flows through the grounds 275, 277 and 281 to the rail 244, through the conductor 333, the contacts 191 and 192 which are adjacent to the platform 185, the conductor 334, and the battery 331.

It may be that it is desired to stop the engine 255 near to the gate 15, when the gate 15 is closed. Under such circumstances, if the train is to stand near the crossing, it may be desirable to raise the gate 15. Under such circumstances, the reverse lever 256 is moved to the neutral position shown in Figure 26 of the drawings. There is then no contact between the spring 262 on the reverse lever 256 and the contacts 258 and 259: nor is there any engagement between the contact spring 263 and the terminals 260 and 261. Thus, the circuit is opened on the locomotive engine, with respect to the ramp 249 and the roller 268, that is, no current flows through these parts. The reversing switch 183 is de-energized, the relay 175 is cut off at the quadrant 257 when the reversing lever 256 is in neutral position, there is a closure at 180—182, and the motor circuit is closed to raise the gate 15. This takes place, at the will of the engineer, when the engine has been brought to a stop near to the gate, as, for instance, when the engine stops for a time at a station.

Referring to the circuit whereby the brake mechanism 20—19 for the motor 17 is controlled, the lever 21 which carries the armature 22 responds to the electro-magnet 23. The circuit for the magnet 23 includes the battery 335, the conductor 336, the electromagnet 23, the conductor 337, the fixed brush 338 of the rotary switch 153, the rotatable contact 339 of the switch 153, the conductor 340, and the battery 335.

The circuit for the main brakes on the gate, meaning thereby, the drums 12 and the straps 93, includes the battery 341, the conductor 342, the winding 500 of the electro-magnets 106, the armature 501, the conductor 343, the fixed brush 344 of the switch 154, the rotary contact 345, the conductor 346, and the battery 341.

When the electro-magnets 106 are energized, the armature 105 operates the inverted U-shaped member 104 of Figure 11, the yoke 101 moving downwardly, the pivot elements 100 tilting the lever 98 on and with the fulcrum member 99, the links 95 applying the brake drums 93 to the drums 12.

The main brakes 93—12 are also mechanically under the control of the platform 200, because, when the platform 200 moves downwardly, the arms 213 rotate the shafts 217 by means of the cranks 216, the crank 144, operating the shaft 139, the arms 142 operating through the swivel 143 of Figure 15, motion being imparted to the rod 110, the connection 109 and the lever 108, the yoke 101, and the parts 98 and 95 being connected to the brake mechanism 93—12.

When the gate 15 is lowered, it is free to rotate on a vertical axis represented by the axis of the hollow pedestal 7. Therefore, if an automobile is on the track 1, the automobile may be run against the gate, to turn it on a vertical axis, as aforesaid, thereby enabling the operator to move away from a place of danger. So long as there is a weight upon the platform, the pinion 132 is out of mesh with the driving train 130, the parts 220, 144, 139, 137, 136, 133, etc., bringing about this result. This circuit for the motor 129 includes a battery 347, the conductor 348, the fixed brush 349, the rotary contact 350, the conductor 351, the motor 129, the conductor 352, the contact 236, the roller 235, the conductor 353, and the battery 347. Whilst there is a weight on the platfrom, the circuit is open at 349—350, but when the vehicle moves off the platform the circuit is closed at 349—350 and remains closed until the roller 235 has ridden off the contact 236. Motion is transmitted from the motor 129 by way of the pinion 131, the driving train 130, the gear 132, the shaft 121, the gears 120, the pinion 117, the gear 9 and the rotatable pedestal 7, the gate, by these instrumentalities, is swung back horizontally, to an original position, after the gate has been swung around horizontally to an open position, by impact with an automobile or other vehicle.

By way of recapitulation, suppose that the gate 15 is raised. Then, the relay 167 is de-energized. The coils of the reversing switch 183 are de-energized, and the switch is held in such a position that no current can flow to the motor 17 on the gate. The lever 111 on the gate operates to hold the reversing switch 183 in neutral position. The rotary switch 154 is operated by the weight of the vehicle on the platform 200, to prevent the motor 17 from lowering the gate if an automobile is beneath the gate. When the gate 15 has nearly reached the end of its forward travel, the rollers 241 and the contact 238 close the circuit to the relay 175, thereby to open the circuit to the motor 17. As soon as the gate 15 starts down, the roller 240 and the contact 237 close the circuit to the red lamp 46 on the gate and light the lamp. If the automobile is on the platform 200, under the gate, and the rotary switch 154 is operated, the brakes 93—12 and the brakes 19—20 are applied to prevent the gate 15 from dropping. When the gate is lowered, and the vehicle is on the platform 200 all power connections to the gate are broken, but as the vehicle pushes the gate 15 open and leaves the platform, the rotary switch 154 closes the circuit to the motor 129, the gearing 132—130 is brought into mesh, and since the roller contact 235 and the strip 236 are in contact, the gate will be returned to its original position, by horizontal swinging movement, until it turns transversely of the road.

In the fall of the year, or in early spring, a cold snap, following a flood or a rainy spell, may result in the formation of ice in the casing 81 which houses the operating parts for the gate 15, and it is to prevent this that the heater 90 is supplied. The heater 128 exercises a corresponding function with respect to the casing 124, and the same may be said of the heater 195 which is located beneath the platform 185.

Having thus described the invention, what is claimed is:—

1. In a device of the class described, a gate mounted for vertical swinging movement, means for swinging the gate vertically, said means including a motor on the gate, a brake restraining the vertical movement of the gate, a switch controlling the brake, a traffic platform, and an operative connection between the traffic platform and the switch.

2. In a device of the class described, a gate mounted for vertical swinging movement, means for swinging the gate vertically, said means including a motor on the gate, a brake controlling the motor, a switch controlling the brake, a traffic platform, and means for connecting the platform operatively with the switch.

3. In a device of the class described, a gate, means for mounting the gate for horizontal swinging movement, a motor, means for connecting the motor to the gate to swing the gate horizontally, said means comprising a driving train, a traffic platform and means for connecting the platform with a part of the driving train to render the driving train operative and inoperative.

4. In a device of the class described, a gate mounted for vertical swinging movement, means for swinging the gate vertically, said means including a motor on the gate and a switch controlling the motor, a traffic platform, means for connecting the platform operatively with the switch, and a brake restraining the vertical swinging movement of the gate, the brake being under the control of the switch.

5. In a device of the class described, a gate mounted for vertical swinging movement, means for swinging the gate vertically, said means including a motor on the gate and a switch controlling the motor, a traffic platform, means for connecting the platform operatively with the switch, and a brake controlling the motor, the brake being under the control of the switch.

6. In a device of the class described, a gate mounted for vertical swinging movement and for horizontal swinging movement, means for swinging the gate vertically, said means including a motor on the gate, a second motor, means for connecting the second motor to the gate to swing the gate horizontally, said means comprising a driving train, a switch controlling both motors, a traffic platform, and mechanism for connecting the traffic platform operatively with the switch.

7. In a device of the class described, a gate mounted for vertical swinging movement and for horizontal swinging movement, a motor, means for connecting the motor to the gate to swing the gate horizontally, said means comprising a driving train, means for swinging the gate vertically, said means including a motor on the gate, a switch controlling the motor, a traffic platform, means for connecting the traffic platform with a part of the driving train to render the driving train operative and inoperative, and means for connecting the platform operatively with the switch.

8. In a device of the class described, a gate mounted for vertical swinging movement and for horizontal swinging movement, a motor, means for connecting the motor to the gate to swing the gate horizontally, said means comprising a driving train, means for swinging the gate vertically, said means including a motor on the gate, a switch controlling the motor, a traffic platform, means for connecting the traffic platform with a part of the driving train to render the driving train operative and inoperative, means for connecting the platform operatively with the switch, and a brake for the first-specified motor, the brake being under the control of the switch.

9. In a device of the class described, a gate mounted for vertical swinging movement and for horizontal swinging movement, a motor, means for connecting the motor to the gate to swing the gate horizontally, said means comprising a driving train, means for swinging the gate vertically, said means including a motor on the gate, a switch controlling the motor, a traffic platform, means for connecting the traffic platform with a part of the driving train to render the driving train operative and inoperative, means for connecting the platform operatively with the switch, and a brake restraining the vertical swinging movement of the gate, the brake being under the control of the switch.

In testimony that I claim the foregoing as my own, I have hereto affixed my signature.

JOHN B. RODGERS.